United States Patent
Stent

(10) Patent No.: US 11,772,671 B2
(45) Date of Patent: Oct. 3, 2023

(54) SYSTEMS AND METHODS FOR PREDICTING CONTROL HANDBACK

(71) Applicant: Toyota Research Institute, Inc., Los Altos, CA (US)

(72) Inventor: Simon A. I. Stent, Cambridge, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 539 days.

(21) Appl. No.: 16/429,637

(22) Filed: Jun. 3, 2019

(65) Prior Publication Data

US 2020/0379460 A1 Dec. 3, 2020

(51) Int. Cl.
*B60W 50/14* (2020.01)
*G05D 1/00* (2006.01)
(Continued)

(52) U.S. Cl.
CPC .............. *B60W 50/14* (2013.01); *B60Q 9/00* (2013.01); *B60W 50/16* (2013.01);
(Continued)

(58) Field of Classification Search
CPC .............. B60Q 9/00; B60W 2050/143; B60W 2050/146; B60W 2540/22; B60W 2540/225; B60W 50/14; B60W 50/16; B60W 60/0053; B60W 10/18; B60W 10/20; B60W 2050/007; B60W 2710/1038; B60W 2710/18; B60W 2710/20; B60W 50/0097; B60W 50/082; G05D 1/0061; G05D 1/0231; G05D 1/0088; G05D 1/0055; G05D 2201/0213; G06K 9/00597; G06K 9/00617; G06K 9/00845; G06K 9/6271;
(Continued)

(56) References Cited

U.S. PATENT DOCUMENTS 8,260,482 B1 * 9/2012 Szybalski ............. B60W 10/04
701/410
8,670,891 B1 * 3/2014 Szybalski ............. B62D 1/286
701/23
(Continued)

FOREIGN PATENT DOCUMENTS

JP 2015175824 A 3/2014
WO 2018105027 A1 6/2018
WO 2018109868 A1 6/2018

OTHER PUBLICATIONS

Hecker, Simon et al., "Failure prediction for autonomous driving," https://arxiv.org/pdf/1805.01811.pdf; Published: May 4, 2018.

*Primary Examiner* — Babar Sarwar
(74) *Attorney, Agent, or Firm* — Dinsmore & Shohl LLP

(57) ABSTRACT

Embodiments described herein include systems and methods for predicting a transfer of control of a vehicle to a driver. A method includes receiving information about an environment of the vehicle, identifying at least one condition represented in the information about the environment of the vehicle that corresponds to at least one of one or more known conditions that lead to a handback of operational control of the vehicle to the driver, and predicting the transfer of control of the vehicle to the driver based on the at least one condition identified from the information about the environment of the vehicle.

18 Claims, 10 Drawing Sheets

(51) Int. Cl.
*G05D 1/02* (2020.01)
*B60Q 9/00* (2006.01)
*B60W 50/16* (2020.01)
*G06V 20/59* (2022.01)
*G06V 40/18* (2022.01)
*G06V 10/764* (2022.01)
*G06V 10/82* (2022.01)

(52) U.S. Cl.
CPC ......... *G05D 1/0061* (2013.01); *G05D 1/0231* (2013.01); *G06V 10/764* (2022.01); *G06V 10/82* (2022.01); *G06V 20/597* (2022.01); *G06V 40/18* (2022.01); *G06V 40/197* (2022.01); *B60W 2050/143* (2013.01); *B60W 2050/146* (2013.01); *B60W 2540/22* (2013.01)

(58) Field of Classification Search
CPC ..... B29C 73/163; B60C 1/0008; B60C 19/12; C08J 2309/06; C08J 2409/06; C08J 3/005; C08L 9/06; C09K 3/10; C09K 2200/0607; C09K 3/1006; G07C 5/0816; G07C 5/085; G07C 5/0825; G07C 5/0833; H04W 4/40
See application file for complete search history.

(56) References Cited

U.S. PATENT DOCUMENTS

| | | | | |
|---|---|---|---|---|
| 8,874,301 | B1* | 10/2014 | Rao | B60K 28/04 |
| | | | | 340/576 |
| 9,802,623 | B2* | 10/2017 | Sugaiwa | B60K 35/00 |
| 9,873,427 | B2* | 1/2018 | Danzl | B60W 10/18 |
| 9,994,219 | B2* | 6/2018 | Nilsson | B60K 28/06 |
| 10,816,973 | B2* | 10/2020 | Jiang | G06N 5/025 |
| 2009/0018723 | A1* | 1/2009 | Chevion | B60W 50/16 |
| | | | | 701/36 |
| 2010/0179715 | A1* | 7/2010 | Puddy | G05D 1/0061 |
| | | | | 701/23 |
| 2011/0241862 | A1* | 10/2011 | Debouk | B60W 60/0018 |
| | | | | 340/439 |
| 2012/0046817 | A1* | 2/2012 | Kindo | B60W 50/082 |
| | | | | 701/23 |
| 2014/0303827 | A1* | 10/2014 | Dolgov | B60W 60/0053 |
| | | | | 701/23 |
| 2016/0103449 | A1* | 4/2016 | Desnoyer | B60W 10/18 |
| | | | | 701/23 |
| 2016/0200317 | A1* | 7/2016 | Danzl | B60W 10/04 |
| | | | | 701/25 |
| 2016/0252903 | A1* | 9/2016 | Prokhorov | G05D 1/0061 |
| | | | | 701/23 |
| 2017/0240186 | A1* | 8/2017 | Hatano | B60W 30/095 |
| 2017/0364070 | A1* | 12/2017 | Oba | G05D 1/0061 |
| 2018/0357493 | A1 | 12/2018 | Takamatsu et al. | |
| 2019/0111942 | A1* | 4/2019 | Suzuki | B60W 10/20 |
| 2019/0111944 | A1* | 4/2019 | Nagahashi | B60W 50/14 |
| 2019/0184998 | A1* | 6/2019 | Zheng | B60W 60/007 |
| 2019/0186947 | A1* | 6/2019 | Rockmore | G01C 21/3629 |
| 2019/0324452 | A1* | 10/2019 | Sato | B60W 50/10 |
| 2020/0064833 | A1* | 2/2020 | Fox | B60W 60/0057 |
| 2020/0065665 | A1* | 2/2020 | Nageshrao | G06N 3/08 |
| 2020/0079395 | A1* | 3/2020 | Ibuka | B60W 60/0053 |
| 2020/0130771 | A1* | 4/2020 | Jacobsz Rosier | B62K 23/02 |
| 2020/0198465 | A1* | 6/2020 | Tanabe | G08G 1/00 |
| 2020/0242408 | A1* | 7/2020 | Kim | G06V 20/56 |

* cited by examiner

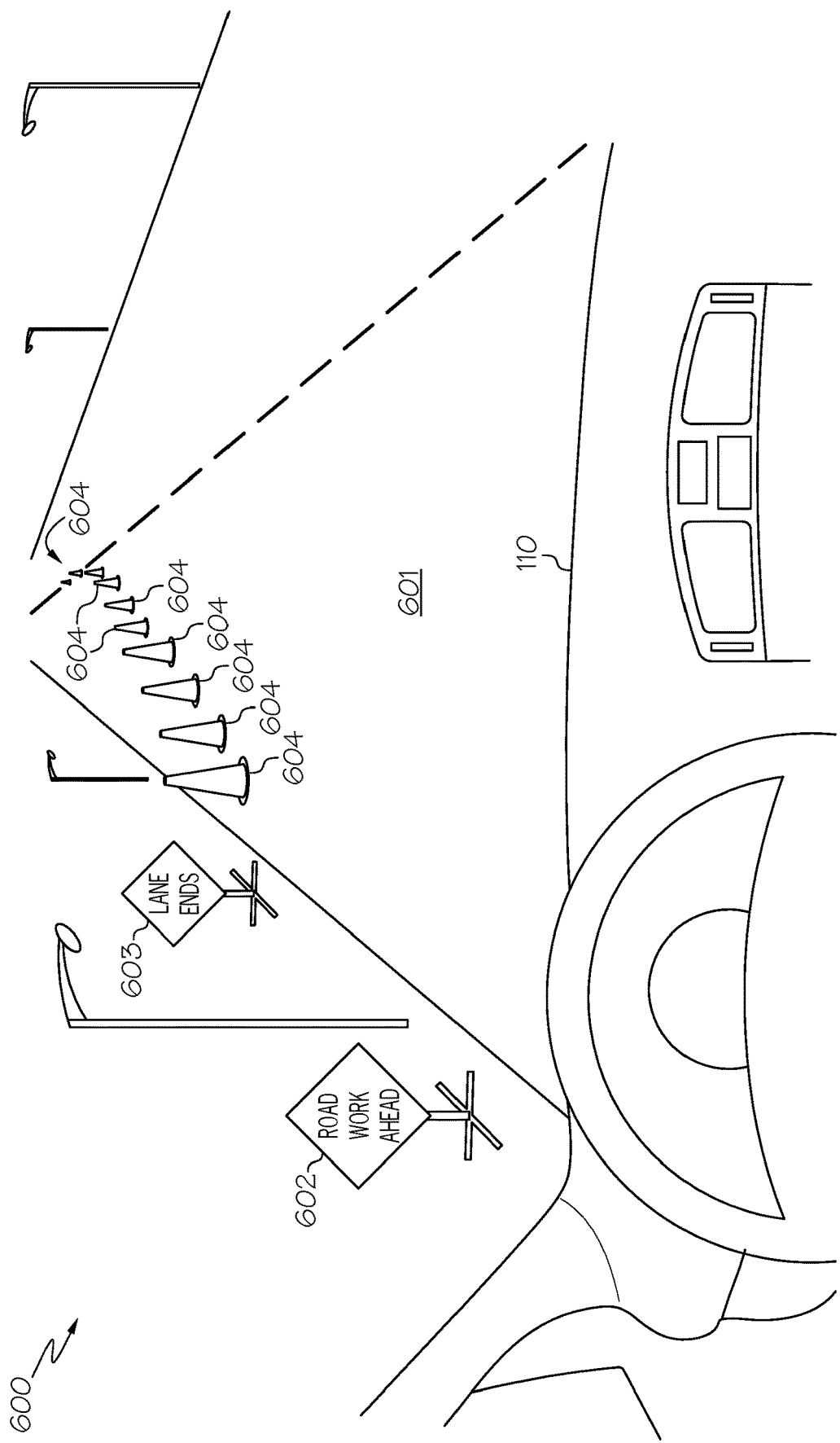

SYSTEMS AND METHODS FOR PREDICTING CONTROL HANDBACK

TECHNICAL FIELD

The present specification generally relates to systems and methods for predicting the transfer of operational control of a vehicle to a driver.

BACKGROUND

Autonomous operation of vehicles continues to evolve and is implemented in varying degrees to assist a driver with operational control of a vehicle. Autonomous systems, for example, provide assistive measures, such as braking, limited full control of vehicle maneuvers when traveling in particular environments, full autonomous control of vehicle maneuvers when traveling between locations, and other levels of control therebetween. Moreover, while autonomous systems continue to develop, many autonomous systems require human interaction during portions of a drive. As a result, a vehicle may handback control of a vehicle to a human driver from time to time during the drive. However, effective handback of control to a human driver is fraught with issues. These issues include, for example, the inability to predict when a handback event will occur, the inability to effectively make the human driver aware of an impending handback of control, and the inability to successfully provide the human driver with information about the environment and state of the vehicle before operational control of the vehicle is transferred to the human driver.

SUMMARY

In embodiments, a method for predicting a transfer of control of a vehicle to a driver includes receiving information about an environment of the vehicle, identifying at least one condition represented in the information about the environment of the vehicle that corresponds to at least one of one or more known conditions that lead to a handback of operational control of the vehicle to the driver, and predicting the transfer of control of the vehicle to the driver based on the at least one condition identified from the information about the environment of the vehicle.

In some embodiments, a system for predicting a transfer of control of a vehicle to a driver includes an electronic control unit and one or more environment sensors communicatively coupled to the electronic control unit. The one or more environment sensors capture information about an environment of the vehicle. The electronic control unit is configured to receive the information about the environment of the vehicle from the one or more environment sensors, identify at least one condition represented in the information about the environment of the vehicle that corresponds to at least one of one or more known conditions that lead to a handback of operational control of the vehicle to the driver, and predict the transfer of control of the vehicle to the driver based on the at least one condition identified from the information about the environment of the vehicle.

In some embodiments, a system for predicting a transfer of control of a vehicle to a driver includes an electronic control unit configured to implement a neural network and one or more environment sensors communicatively coupled to the electronic control unit. The one or more environment sensors capture information about an environment of the vehicle. The electronic control unit is configured to receive, as an input to the neural network, the information about the environment of the vehicle from the one or more environment sensors, identify, with the neural network, at least one condition represented in the information about the environment of the vehicle that corresponds to at least one of one or more known conditions that lead to a handback of operational control of the vehicle to the driver, and predict, with the neural network, the transfer of control of the vehicle to the driver based on the at least one condition identified from the information about the environment of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6A depicts an illustrative environment around a vehicle including one or more conditions indicative of a transfer of control of the vehicle to the driver, according to one or more embodiments shown and described herein;

DETAILED DESCRIPTION

Figure 1:
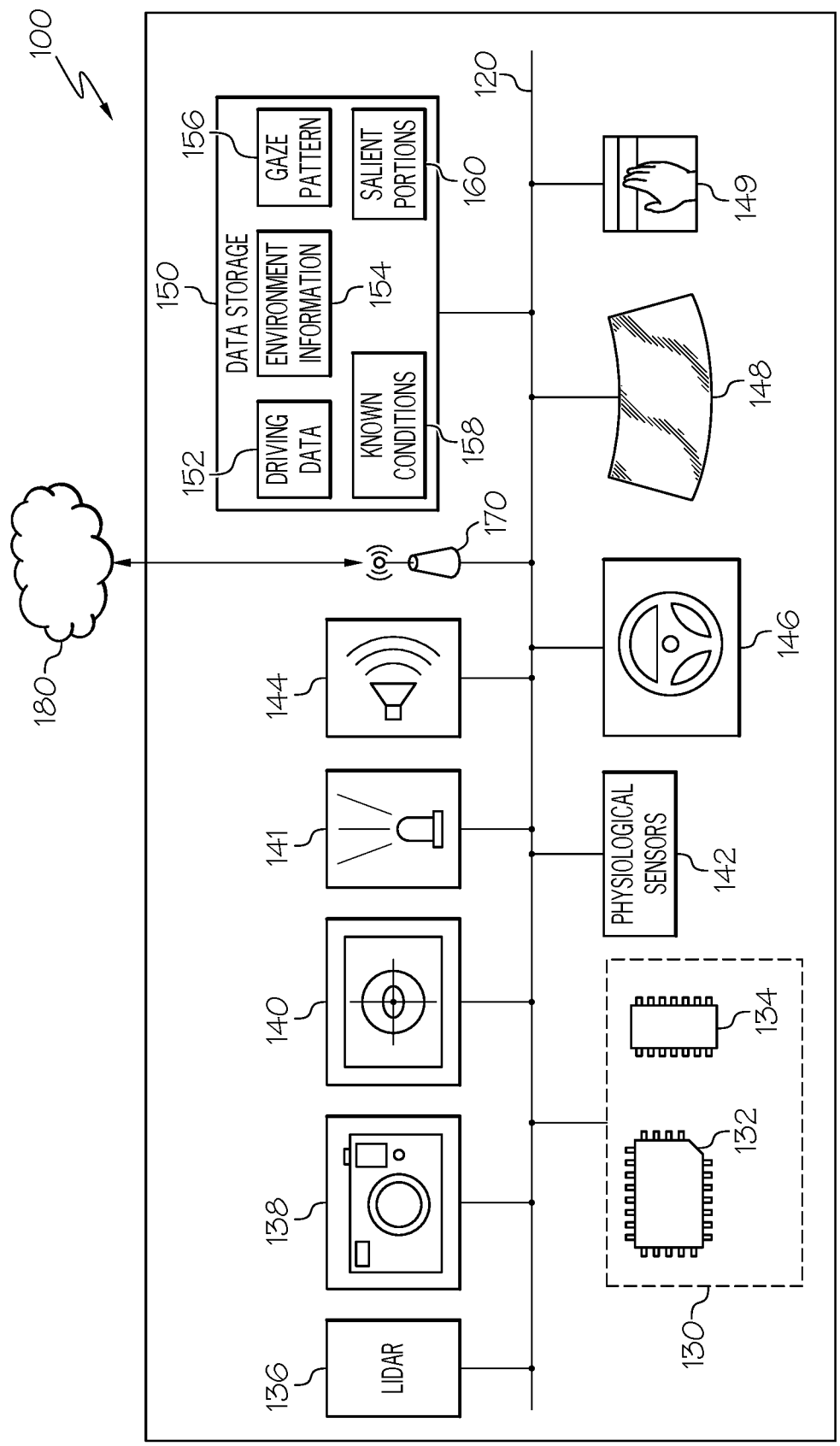
FIG. 1 depicts an illustrative system for predicting a transfer of control of a vehicle to a driver, according to one or more embodiments shown and described herein.

Embodiments described herein relate to systems and methods for predicting occurrences of handback events (i.e., the transfer of operational control of a vehicle to a driver). Handback events may occur, for example, when an autonomous system has completed a routine for assisting a driver to navigate a vehicle, when the autonomous system encounters an environment or situation which the system is not capable of navigating or may require intermittent or full assumption of control by a driver, or when a driver decides to retake control of a vehicle. Regardless of the reason why a handback event is triggered, it is important that a driver be prepared to assume control. The systems and methods disclosed herein are directed to predicting an occurrence of a handback event, which may allow a driver may be duly informed and prepared to assume control. For example, as autonomous systems advance there will be fewer and fewer situations where a driver needs to maintain full attention to the driving environment. However, when a situation arises that may require the driver's engagement in control of the vehicle, a driver may need to be alerted with sufficient notice to prepare to assume control.

One of the challenges in handing back control of a vehicle is determining when these events will occur. The challenge includes not only determining whether the driver is ready and aware to receive operational control of the vehicle, but also in providing an alert that will not be ignored over time due to false positive activation. As such, depending on how likely a handback event is to occur in the future, a degree or type of alert may be determined and generated that corresponds to the likelihood and/or imminence of the predicted handback event. In some embodiments, an aspect of the systems and methods disclosed herein is to provide a degree or type of alert that correspond to the likelihood and/or imminence of the predicted handback event. In some embodiments, an aspect of the systems and methods disclosed herein is to provide an alert that corresponds to the driver's attention and/or awareness to the present driving environment. For example, if the driver is well aware of the environment, a subtle alert may be provided. Whereas, if the driver is distracted, for example, looking at their phone and not the road while the vehicle is in an autonomous mode, then a progressively increasing degree or various types of alerts (e.g., audio, visual, haptic, or the like) may need to be implemented.

Embodiments described in more detail herein generally include utilizing information generated by environment sensors configured to capture features and the environment around a vehicle to predict whether a handback event will occur. The information may include road scene data in the form of image data, LIDAR data, or another form of mapping data that can be analyzed to determine conditions within the environment. As used herein, the term "conditions" refers to the detection of an object, sign, vehicle, animal, person, or the like within the environment which when combined with other circumstances may form a sequence of occurrences or events that may lead to a handback event. For example, detection that traffic is slowing down may be a first condition, detection of a construction sign may be another condition, and detection of a flagman directing traffic may be yet another condition. As each of these conditions are detected, a prediction that a handback event will occur may be made. Moreover, as more conditions are detected and compared with known conditions that have led to past handback events, the likelihood that a handback event will occur may increase.

Referring back to the aforementioned example, when taken in combination, these conditions may indicate that there is an approaching detour in the roadway. In the event a detour is determined, an autonomous system may require a driver begin paying closer attention to the environment so that she may readily assume control if necessary or receive operational control and navigate through the detour. An alert having a degree or type corresponding to the imminence and/or likelihood of the predicted handback event may be implemented to communicate with the driver and prepare the driver for a possible transfer of operational control from an autonomous system to the driver. This is only one non-limiting example of detected conditions within an environment that result in a prediction of a handback event.

As will be described in more detail herein, in some embodiments, the systems and methods may implement a neural network that is configured to learn one or more conditions and/or sequences of conditions that lead to a handback event. When trained, the neural network may receive information from environment sensors and predict of occurrences of handback events.

Embodiments of the present disclosure are directed to systems and methods for predicting occurrences of a handback event and providing alerts to a driver based on the predictions. The following will now describe these systems and methods in more detail with reference to the drawings and where like numbers refer to like structures.

Referring now to FIG. 1, a system 100 for predicting a transfer of control of a vehicle to a driver is depicted. The system 100 may include an electronic control unit 130. The electronic control unit 130 may include a processor 132 and a memory component 134. The system 100 may also include a communication bus 120, a LIDAR system 136, one or more cameras 138, a gaze-tracking system 140, an illuminating device 141, one or more physiological sensors 142, a speaker 144, a steering wheel system 146, a heads-up display system 148, a vehicle display 149, a data storage component 150 and/or network interface hardware 170. As referred to herein, the term "one or more environment sensors" may include the LIDAR system 136, one or more cameras 138, and/or a variety of other sensor systems capable of ascertaining information about the environment around a vehicle and functionality of the vehicle such as a vehicle speed, a rate of acceleration or deceleration of the vehicle, a vehicle location, a vehicle heading, or the like. The system 100 may be communicatively coupled to a network 180 by way of the network interface hardware 170. The components of the system 100 are communicatively coupled to each other via the communication bus 120.

It is understood that the embodiments depicted and described herein are not limited to the components or configurations depicted and described with respect to FIG. 1, rather FIG. 1 is merely for illustration. The various components of the system 100 and the interaction thereof will be described in detail below.

The communication bus 120 may be formed from any medium that is capable of transmitting a signal such as, for example, conductive wires, conductive traces, optical waveguides, or the like. The communication bus 120 may also refer to the expanse in which electromagnetic radiation and their corresponding electromagnetic waves traverses. Moreover, the communication bus 120 may be formed from a combination of mediums capable of transmitting signals. In one embodiment, the communication bus 120 comprises a combination of conductive traces, conductive wires, connectors, and buses that cooperate to permit the transmission of electrical data signals to components such as processors 132, memories, sensors, input devices, output devices, and communication devices. Accordingly, the communication bus 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication bus 120 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and the memory component 134. The processor 132 of the system 100 may be any device capable of executing the machine-readable instruction set stored in the memory component 134. Accordingly, the processor 132 may be an electric controller, an integrated circuit, a microchip, a field programmable gate array, a computer, or any other computing device. The processor 132 is communicatively coupled to the other components of the system 100 by the communication bus 120. Accordingly, the communication bus 120 may communicatively couple any number of processors 132 with one another, and allow the components coupled to the communication bus 120 to operate in a distributed computing environment. Specifically, each of the components may operate as a node that may send and/or receive data. While the embodiment depicted in FIG. 1 includes a single processor 132, other embodiments may include more than one processor 132.

The memory component 134 of the system 100 is coupled to the communication bus 120 and communicatively coupled to the processor 132. The memory component 134 may be a non-transitory computer readable memory and may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as machine language that may be directly executed by the processor 132, or assembly language, object-oriented programming (OOP), scripting languages, microcode, etc., that may be compiled or assembled into machine readable instructions and stored in the memory component 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the system 100 depicted in FIG. 1 includes a single memory component 134, other embodiments may include more than one memory component 134.

Still referring to FIG. 1, in some embodiments, the system 100 may include a LIDAR system 136. The LIDAR system 136 is communicatively coupled to the communication bus 120 and the electronic control unit 130. The LIDAR system 136 is used in a light detection and ranging system that uses pulsed laser light to measure distances from the LIDAR system 136 to objects that reflect the pulsed laser light. The LIDAR system 136 may be made of solid-state devices with few or no moving parts, including those configured as optical phased array devices where its prism-like operation permits a wide field-of-view without the weight and size complexities associated with a traditional rotating LIDAR sensor. The LIDAR system 136 is particularly suited to measuring time-of-flight, which in turn can be correlated to distance measurements with objects that are within a field-of-view of the LIDAR system 136. By calculating the difference in return time of the various wavelengths of the pulsed laser light emitted by the LIDAR system 136, a digital 3-D representation of a target or environment may be generated. The pulsed laser light emitted by the LIDAR system 136 may be operated in or near the infrared range of the electromagnetic spectrum, with one example having emitted radiation of about 905 nanometers. Sensors such as LIDAR system 136 can be used by vehicles such as vehicle 110 (FIG. 2) to provide detailed 3-D spatial information for the identification of objects near the vehicle 110, as well as the use of such information in the service of systems for vehicular mapping, navigation and autonomous operations, especially when used in conjunction with geo-referencing devices such as GPS or a gyroscope-based inertial navigation unit (INU, not shown) or related dead-reckoning system, as well as non-transitory computer readable memory 134 (either its own or memory of the electronic control unit 130).

The system 100 may also include one or more cameras 138. The one or more cameras 138 may be communicatively coupled to the communication bus 120 and to the processor 132. The one or more cameras 140 may be any device having an array of sensing devices (e.g., pixels) capable of detecting radiation in an ultraviolet wavelength band, a visible light wavelength band, or an infrared wavelength band. The one or more cameras 138 may have any resolution. The one or more cameras 138 may be an omni-directional camera, or a panoramic camera, for example. In some embodiments, one or more optical components, such as a mirror, fish-eye lens, or any other type of lens may be optically coupled to each of the one or more cameras 138. In embodiments described herein, the one or more cameras 138 may capture image data or video data of an environment of a vehicle. That is, with reference to FIG. 2, a vehicle 110 having wheels 115 may include one or more cameras 138 mounted thereon. The one or more cameras 138 may be mounted on a dashboard of a vehicle 110, on a rearview mirror, or elsewhere on the vehicle 110 such that the one or more cameras 138 may capture road-scene data of the environment around a vehicle 110. In some embodiments, the vehicle 110 may further include one or more components of the system 100 such as an electronic control unit 130 configured with a trained neural network as described herein. That is, the vehicle 110 may receive road-scene data from the camera and predict, with the neural network, an occurrence of a handback event. In response to predicting an occurrence of a handback event, the electronic control unit 130 may output an alert to the driver warning them of an impending handback event so that the driver may become aware of the environment of the vehicle and prepare to receive operational control of the vehicle 110.

The system 100 may include a gaze-tracking system 140 for tracking an eye or gaze direction of a subject to generate a gaze direction vector for determining where a driver is looking. The gaze-tracking system 140 may include one or more cameras 138 and/or an array of infrared light detectors positioned to view one or more eyes of a subject. The gaze-tracking system 140 may also include or be communicatively coupled to an illuminating device 141 which may be an infrared or near-infrared light emitter. The illuminating device 141 may emit infrared or near-infrared light, which may be reflected off a portion of the eye creating a profile that is more readily detectable than visible light reflections off an eye for eye-tracking purposes.

The gaze-tracking system 140 may be spatially oriented in an environment and generate a gaze direction vector. One of a variety of coordinate systems may be implemented such as user coordinate system (UCS). For example, the UCS has its origin at the center of the front surface of the gaze-tracker. With the origin defined at the center of the front surface (e.g., the eye-tracking camera lens) of the gaze-tracking system 140, the gaze direction vector may be defined with respect to the location of the origin. Furthermore, when spatially orienting the gaze-tracking system 140 in the environment, all other objects including the one or more cameras 138 may be localized with respect to the location of the origin of the gaze-tracking system 140. In some embodiments, an origin of the coordinate system may be defined at a location on the subject, for example, at a spot between the eyes of the subject. Irrespective of the location of the origin for the coordinate system, a calibration process may be employed by the gaze-tracking system 140 to calibrate a coordinate system for collecting gaze-tracking data for training the neural network.

Still referring to FIG. 1, the system 100 may further include one or more physiological sensors 142. The one or more physiological sensors 142 may be communicatively coupled to the communication bus 120 and to the processor 132. The one or more physiological sensors 142 may be any device capable of monitoring and capturing physiological states of the human body, such as a driver's stress level through monitoring electrical activity of the heart, skin conductance, respiration, or the like. The one or more physiological sensors 142 include sensors configured to measure bodily events such as heart rate change, electrodermal activity (EDA), muscle tension, and cardiac output. The one or more physiological sensors 142 may monitor brain waves through electroencephalography, EEG, electrodermal activity through a skin conductance response, SCR, and galvanic skin response, GSR, cardiovascular measures such as heart rate, HR; beats per minute, BPM; heart rate variability, HRV; vasomotor activity, muscle activity through electromyography, EMG, changes in pupil diameter with thought and emotion through pupillometry (e.g., pupillometry data), eye movements, recorded via the electrooculogram, EOG and direction-of-gaze methods, and cardiodynamics recorded via impedance cardiography, or other physiological measures.

The physiological sensors 142 may generate physiological response data that may be utilized to train or evolve a neural network to determine a state of awareness of a driver. For example, a speed of change, the degree of change, or the intensity of the resulting physiological condition such as the speed or amount of pupil dilation or elevation in heart rate may be captured by the one or more physiological sensors 142. The observed changes may be translated into a state of awareness of conditions within the environment.

The system 100 may also include a speaker 144. The speaker 144 (i.e., an audio output device) is coupled to the communication bus 120 and communicatively coupled to the processor 132. The speaker 144 transforms audio message data as signals from the processor 132 of the electronic control unit 130 into mechanical vibrations producing sound. For example, the speaker 144 may provide to the driver a notification, alert, or warning of an impending handback event. The notification may include prompts such as an estimate as to how much time until a handback event, information about the environment such as "entering a construction zone, prepare to assume control of the vehicle," or other information to alert the driver of a predicted handback event. However, it should be understood that, in other embodiments, the system 100 may not include the speaker 144.

The steering wheel system 146 is coupled to the communication bus 120 and communicatively coupled to the electronic control unit 130. The steering wheel system 146 may comprise a plurality of sensors located in the steering wheel for determining a driver grip on the steering wheel, the degree of rotation applied to the steering wheel or the forces applied in turning or maintaining the steering wheel. The steering wheel system 146 may provide signals to the electronic control unit 130 indicative of the location and number of hands on the steering wheel, the strength of the grip on the steering wheel, or changes in position of one or more hands on the steering wheel. The steering wheel system 146, for example, without limitation, may include pressure sensors, inductive sensors, optical sensors, or the like. In addition to detecting the location, number, grip and change in position of one or more hands on the steering wheel, the steering wheel system 146 may also include one or more sensors indicating the rotational angle of the steering wheel and corresponding signals to the electronic control unit 130. As later described, the combination of steering wheel rotation and steering wheel grip may be suggestive of a driver planning to or desiring to take control of the vehicle. The steering wheel system 146 may include motors or components to provide haptic feedback to the driver. For example, the steering wheel system 146 may be configured to provide vibrations of varying intensity through the steering wheel to indicate the varying likelihood that a predicted handback event will occur.

The heads-up display system 148 may be included with the system 100 for presenting visual indications to a driver of locations within the environment that are salient to the predicted handback event. For example, a heads-up display system 148 may highlight or annotated portions of the environment having conditions that are related to a prediction of a handback event. Such indications may allow the driver to rapidly ascertain conditions within the environment that are important to become aware of in preparation of assuming operational control of the vehicle. A heads-up display system 148 may be a display device integrated with the windshield or other display device within the vehicle. In some embodiments, the heads-up display system 148 may include a projector that projects images onto the windshield through one or more lens systems. However, this is only one example implementation of a heads-up display system 148.

The system 100, for example, as implemented in a vehicle 110 (FIG. 2), may include a vehicle display 149. The vehicle display 149 may be a display device. The display device may include any medium capable of transmitting an optical output such as, for example, a cathode ray tube, light emitting diodes, a liquid crystal display, a plasma display, or the like. The vehicle display 149 may be configured to display a visual alert or warning message, image data or a saliency map of the vehicle environment, or the like to the driver. The visualization on the vehicle display 149 may assist in bringing one or more portions of an environment to the driver's attention that may correspond to detected conditions within the environment that correspond to a predicted handback event. The vehicle display 149 may also include one or more input devices. The one or more input devices may be any device capable of transforming user contact into a data signal that can be transmitted over the communication bus 120 such as, for example, a button, a switch, a knob, a microphone or the like. In some embodiments, the one or more input devices include a power button, a volume button, an activation button, a scroll button, or the like. The one or more input devices may be provided so that the user may interact with the vehicle display 149, such as to navigate menus, make selections, set preferences, and other functionality described herein. In some embodiments, the input device includes a pressure sensor, a touch-sensitive region, a pressure strip, or the like.

A data storage component 150 that is communicatively coupled to the system 100 may be a volatile and/or non-volatile digital storage component and, as such, may include random access memory (including SRAM, DRAM, and/or other types of random access memory), flash memory, registers, compact discs (CD), digital versatile discs (DVD), and/or other types of storage components. The data storage component 150 may reside local to and/or remote from the system 100 and may be configured to store one or more pieces of data (e.g., driving data 152, environment information 154, gaze patterns 156, known conditions 158, and/or salient portions 160 of the environment) for access by the system 100 and/or other components. As illustrated in FIG. 1, the data storage component 150 stores, for example, driving data 152 that may include information from one or more environment sensors recorded during past driving events. The driving data 152 may include image data, LIDAR data, speed data, location information, navigation or route information, acceleration or deceleration activity, or the like. The driving data 152 may be segmented into sets of data where a first set of driving data 152 includes information leading up to an automatic transfer of operational control from an autonomous system to a human driver (i.e., a handback event). A second set of driving data 152 may include information leading up to a manual transfer of operational control of a vehicle by the driver. For example, the driver may manually deactivate an autonomous system and take over operation of the vehicle.

The data storage component 150 may also include environment information 154. The environment information 154 includes information generated by one or more environment sensors. In some embodiments, the information from the one or more environment sensors may be temporarily stored in the data storage component 150 before processing by the electronic control unit 130. While in some embodiments, the environment information 154 is recorded for later analysis or use in training a neural network to predict an occurrence of a handback event. The data storage component 150 may also record and/or store gaze pattern data 156 generated by the gaze-tracking system 140.

In some embodiments, the system 100 may be preprogramed or include a learned set of known conditions 158 that occur or present themselves in an environment prior to a handback event. The one or more known conditions 158 may be compared or analyzed in conjunction with environment information 154 to determine whether at least one condition of possibly several conditions exist within the environment information 154 that would lead to a handback event. For example, a first handback event may occur when known conditions: condition A, condition B, and condition C are detected within the environment information 154. Therefore, a prediction that a handback event may occur may be made when condition A is detected in the environment information 154. The likelihood that the predicted handback event occurs may include a confidence value of 33% on a scale of 0% to 100% with 100% representing an imminent handback event. As further conditions are detected, for example, once condition A and condition B are detected, then the likelihood that the predicted handback event occurs may include an increase confidence value (i.e., greater than 33% where only condition A was detected). Moreover, once condition A, condition B, and condition C are detected, then the likelihood that the predicted handback event occurs may include an even further increase in the confidence value.

In some embodiments, image data captured by the one or more cameras 138 may be analyzed to determine salient portions 160 within the image data of the environment. The salient portions 160 correspond to the one or more known conditions 158 that lead to a handback event. Salient portions 160 may be determined through implementation of one or more known or yet to be developed saliency based image segmentation algorithms. As will be described in more detail herein, the salient portions 160 of the environment may be compared with a gaze pattern of a driver to determine that state of awareness of a driver.

Still referring to FIG. 1, the system 100 may also include network interface hardware 170 that is communicatively coupled to the electronic control unit 130 via the communication bus 120. The network interface hardware 170 may include any wired or wireless networking hardware, such as a modem, LAN port, Wi-Fi card, WiMax card, mobile communications hardware, and/or other hardware for communicating with a network 180 and/or other devices and systems. For example, the system 100 may be communicatively coupled to a network 180 by way of the network interface hardware 170.

Figure 2:
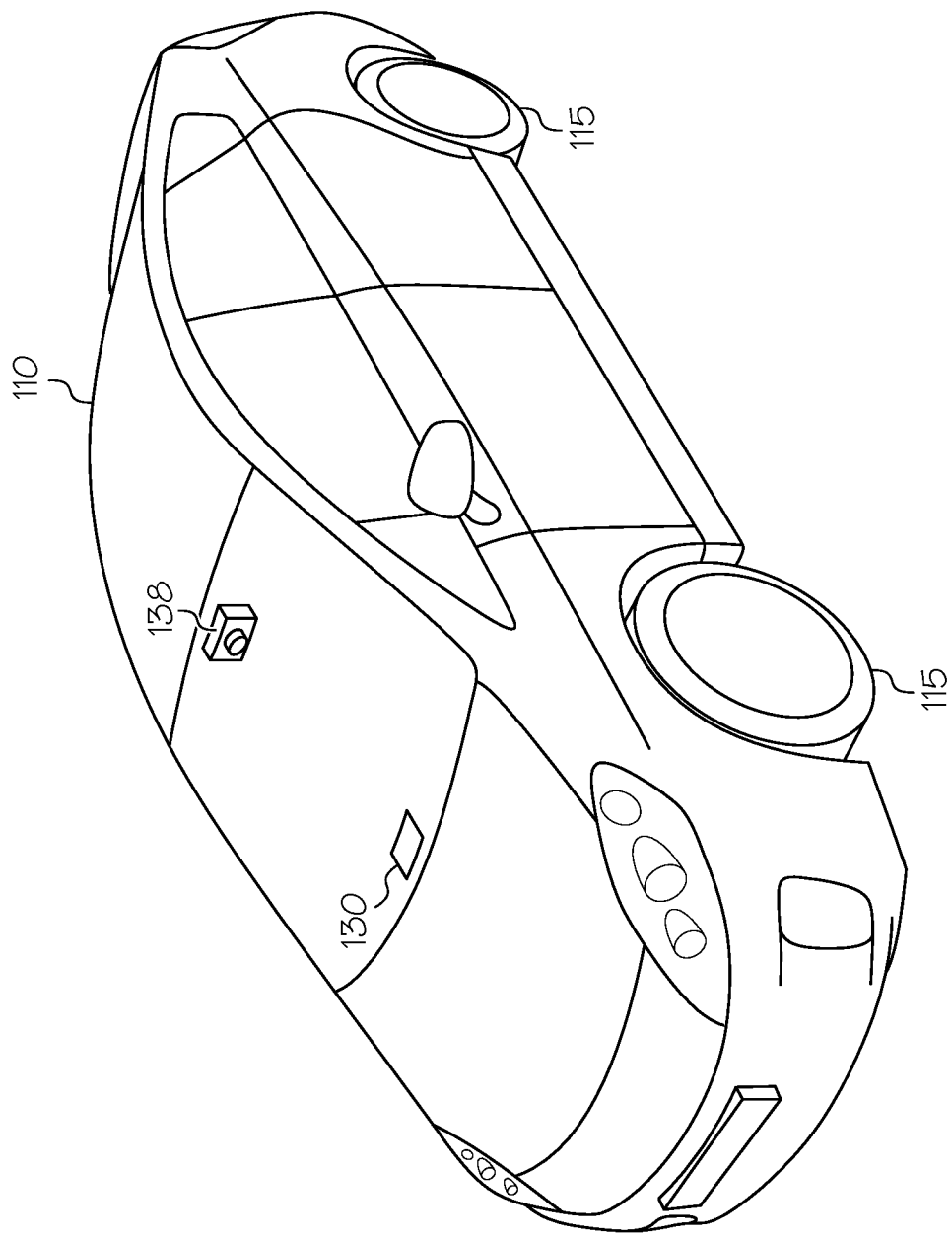
FIG. 2 depicts an illustrative vehicle implemented with the system depicted in FIG. 1, according to one or more embodiments shown and described herein.

Turning now to FIG. 2, an illustrative vehicle 110 implemented with the system 100 is depicted. The system for predicting a handback event may be implemented in a vehicle 110 having one or more wheels 115. The vehicle 110 may include one or more environment sensors, for example, one or more cameras 138 mounted on the vehicle 110 and communicatively coupled to an electronic control unit 130. The vehicle 110 may be a level 1, level 2, level 3, level 4, or level 5 autonomous vehicle 110.

Figure 3:
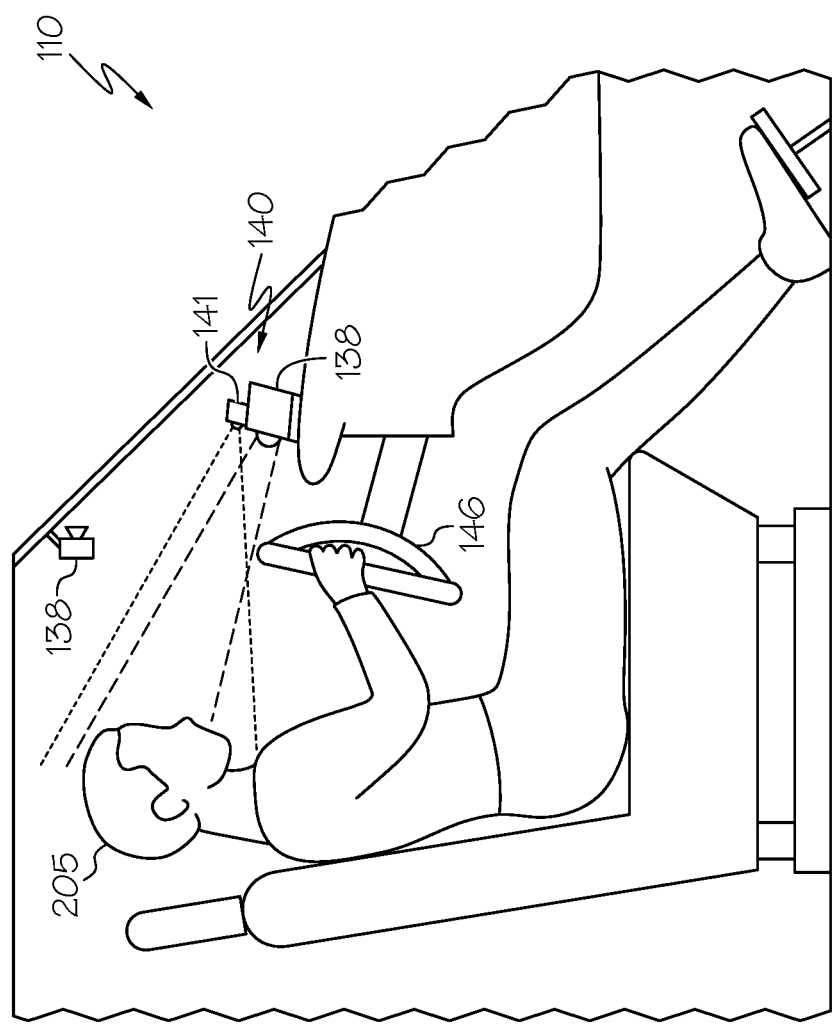
FIG. 3 depicts another illustrative environment for capturing a gaze of a driver utilizing a gaze tracking system, according to one or more embodiments shown and described herein.

The vehicle 110 may also include a gaze-tracking system 140 for monitoring the state of awareness of a driver 205, as illustratively depicted in FIG. 3. The gaze-tracking system 140 may be positioned in the vehicle 110 so that a camera or detection device (e.g., 138) is configured to capture eye, head, and/or body positions of the driver. An illuminating device 141, for example, an infrared lamp, may direct infrared light toward the driver to enhance detection of eye, head, and/or body positions, which may translate into gaze direction vectors.

Figure 4:
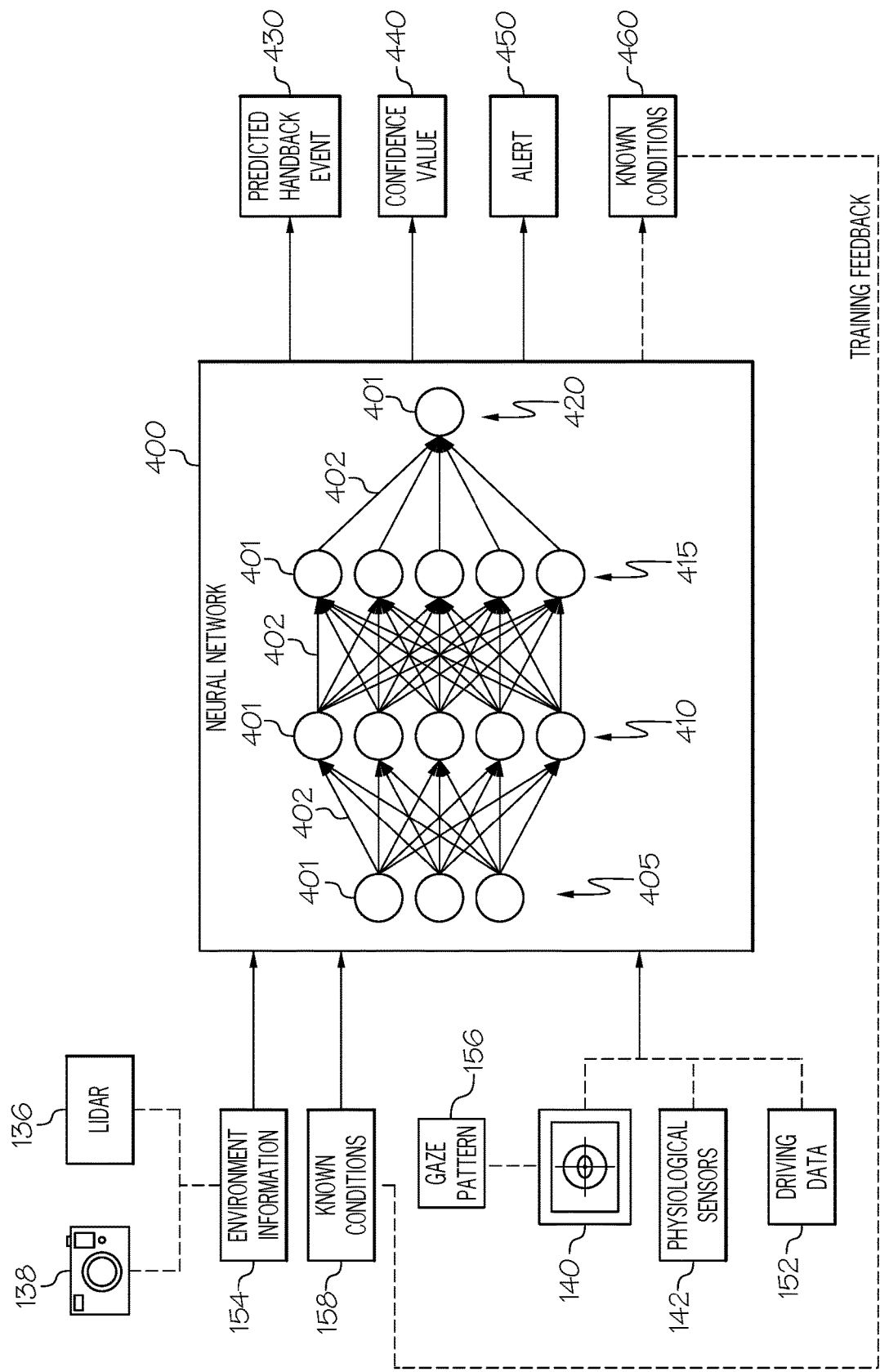
FIG. 4 depicts an illustrative diagram for a neural network model for predicting the transfer of control of the vehicle to the driver, according to one or more embodiments shown and described herein.

Referring now to FIG. 4, an illustrative diagram for training a neural network 400 for predicting the transfer of control of the vehicle to the driver is depicted. In some embodiments, the neural network 400 may include one or more layers 405, 410, 415, 420, having one or more nodes 401, connected by node connections 402. The one or more layers 405, 410, 415, 420 may include an input layer 405, one or more hidden layers 410, 415, and an output layer 420. The input layer 405 represents the raw information that is fed into the neural network 400. For example, environment information 154 from one or more environment sensors (e.g., the LIDAR system 136 and/or one or more cameras 138), known conditions 158, gaze patterns 156 from the gaze-tracking system 140, physiological response data from one or more physiological sensors 142, and/or driving data 152 may be input into the neural network 400 at the input layer 405. The neural network 400 processes the raw information received at the input layer 405 through nodes 401 and node connections 402. The one or more hidden layers 410, 415, depending on the inputs from the input layer 405 and the weights on the node connections 402, carry out computational activities. In other words, the hidden layers 410, 415 perform computations and transfer information from the input layer 405 to the output layer 420 through their associated nodes 401 and node connections 402.

In general, when a neural network 400 is learning, the neural network 400 is identifying and determining patterns within the raw information received at the input layer 405. In response, one or more parameters, for example, weights associated to node connections 402 between nodes 401, may be adjusted through a process known as back-propagation. It should be understood that there are various processes in which learning may occur, however, two general learning processes include associative mapping and regularity detection. Associative mapping refers to a learning process where a neural network 400 learns to produce a particular pattern on the set of inputs whenever another particular pattern is applied on the set of inputs. Regularity detection refers to a learning process where the neural network 400 learns to respond to particular properties of the input patterns. Whereas in associative mapping the neural network 400 stores the relationships among patterns, in regularity detection the response of each unit has a particular 'meaning'. This type of learning mechanism may be used for feature discovery and knowledge representation.

Neural networks possess knowledge that is contained in the values of the node connection weights. Modifying the knowledge stored in the network as a function of experience implies a learning rule for changing the values of the weights. Information is stored in a weight matrix W of a neural network. Learning is the determination of the weights. Following the way learning is performed, two major categories of neural networks can be distinguished: 1) fixed networks in which the weights cannot be changed (i.e., dW/dt=0) and 2) adaptive networks that are able to change their weights (i.e., dW/dt not=0). In fixed networks, the weights are fixed a priori according to the problem to solve.

In order to train a neural network to perform some task, adjustments to the weights are made in such a way that the error between the desired output and the actual output is reduced. This process may require that the neural network compute the error derivative of the weights (EW). In other words, it must calculate how the error changes as each weight is increased or decreased slightly. A back propagation algorithm is one method that is used for determining the EW.

The algorithm computes each EW by first computing the error derivative (EA), the rate at which the error changes as the activity level of a unit is changed. For output units, the EA is simply the difference between the actual and the desired output. To compute the EA for a hidden unit in the layer just before the output layer, first all the weights between that hidden unit and the output units to which it is connected are identified. Then, those weights are multiplied by the EAs of those output units and the products are added. This sum equals the EA for the chosen hidden unit. After calculating all the EAs in the hidden layer just before the output layer, in like fashion, the EAs for other layers may be computed, moving from layer to layer in a direction opposite to the way activities propagate through the neural network, hence "back propagation". Once the EA has been computed for a unit, it is straightforward to compute the EW for each incoming connection of the unit. The EW is the product of the EA and the activity through the incoming connection. It should be understood that this is only one method in which a neural network is trained to perform a task.

Referring back to FIG. 4, the neural network 400 may include one or more hidden layers 410, 415 that feed into one or more nodes 401 of an output layer 420. There may be one or more output layers 420 depending on the particular output the neural network 400 is configured to generate. For example, the neural network 400 may be trained to output a prediction of an occurrence of a handback event 430, generate a confidence value 440 associated with the predicted handback event 430, determine a degree and type of an alert 450 for providing to the driver and/or determining known conditions 460 that leads to a handback event 430. The known conditions 460 that are determined by the neural network 400 in training may be used as feedback for further training the neural network 400.

Figure 5A:
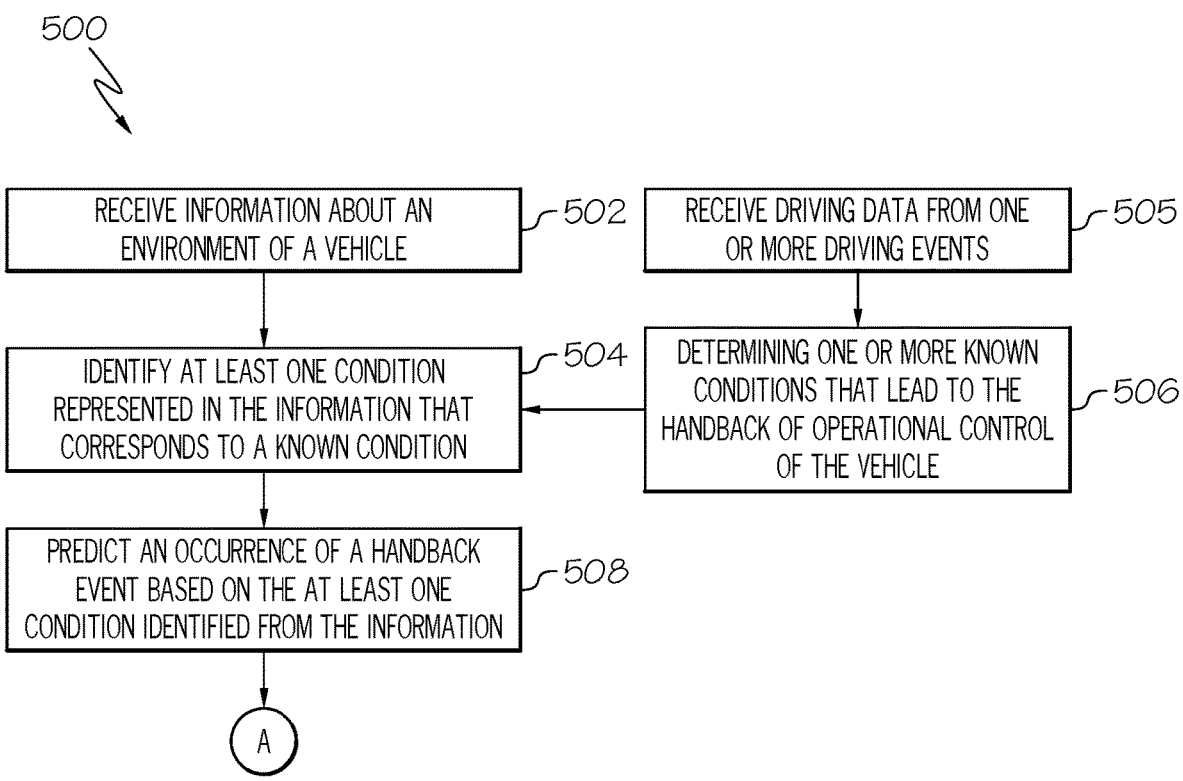
FIG. 5A depicts an illustrative flow diagram predicting a transfer of control of a vehicle to a driver, according to one or more embodiments shown and described herein.
Figure 5B:
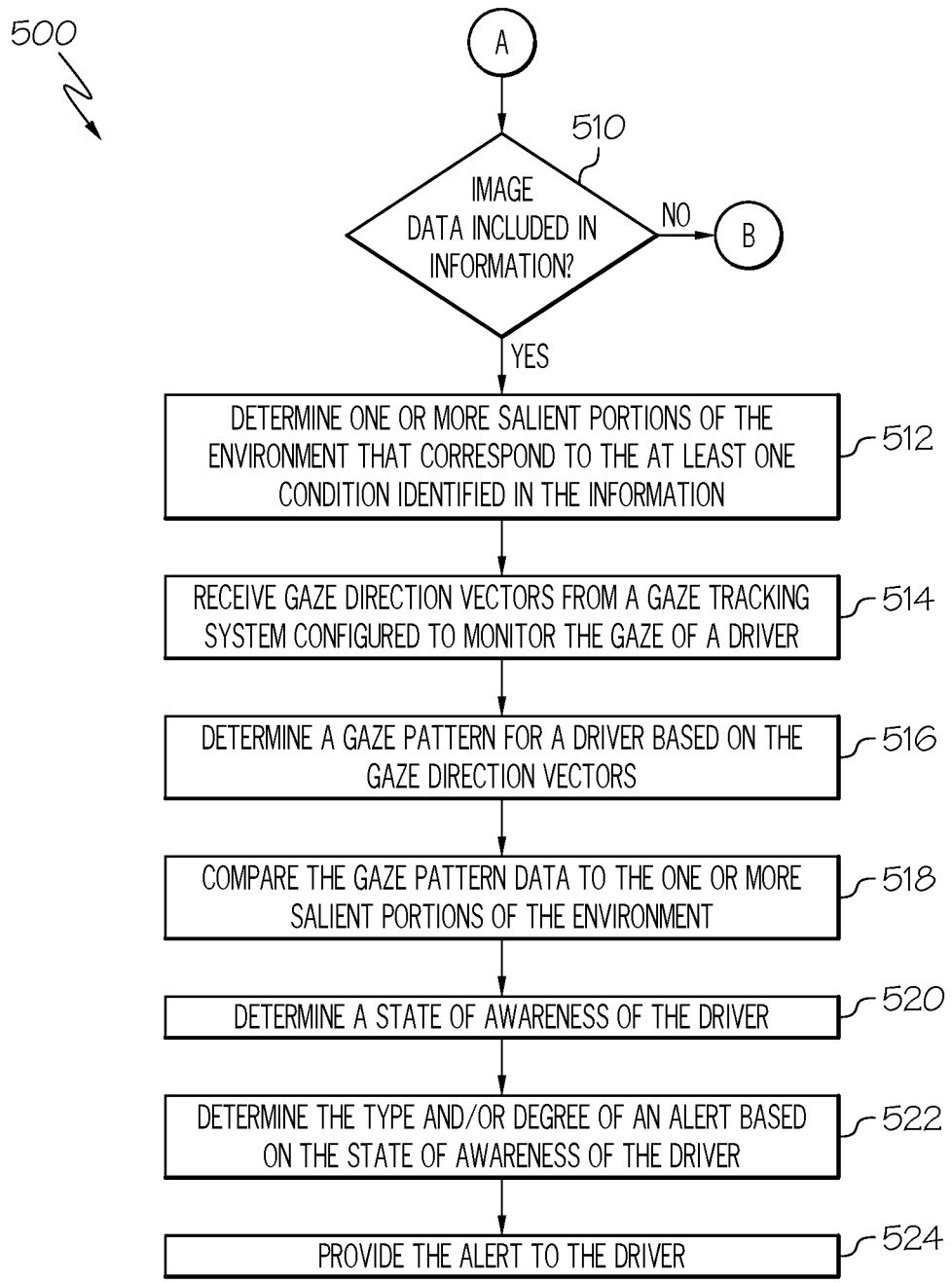
FIG. 5B further depicts the illustrative flow diagram predicting a transfer of control of a vehicle to a driver, according to one or more embodiments shown and described herein.
Figure 5C:
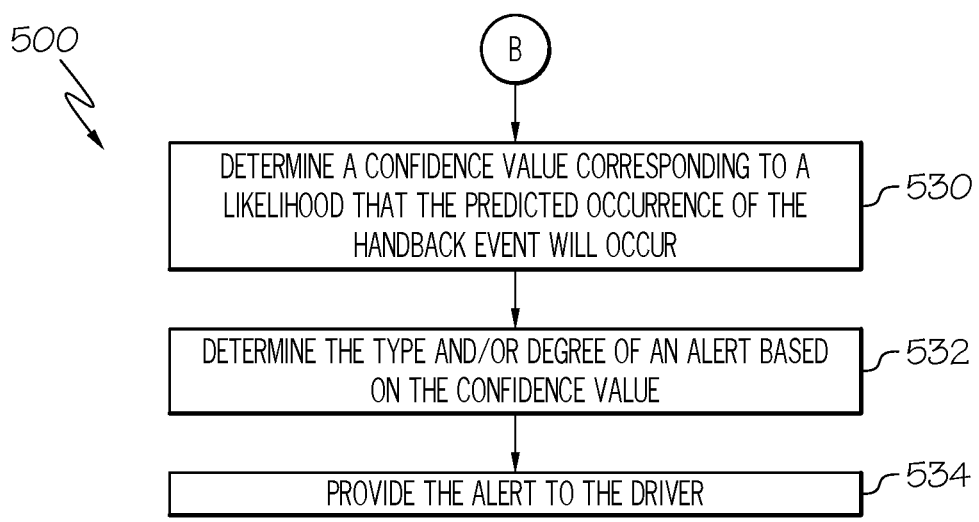
FIG. 5C further depicts the illustrative flow diagram predicting a transfer of control of a vehicle to a driver, according to one or more embodiments shown and described herein.

Turning to FIGS. 5A-5C, an illustrative flow diagram 500 for predicting a transfer of control of a vehicle to a driver is depicted. Flow diagram 500 is only one method, implemented by a system that predicts a transfer of control from an autonomous mode to a driver. At block 502, the system receives information about an environment of the vehicle. The information includes road scene data in the form of image data, LIDAR data, and/or another form of data that can be analyzed to determine conditions within the environment from the information collected by one or more of the environment sensors. At block 504, the system identifies at least one condition represented in the information that corresponds to at least one of one or more known conditions that leads to a handback of operational control of the vehicle to the driver.

In some embodiments, the system may receive driving data, which includes data from one or more driving events, at block 505. The system analyzes the driving data. The driving data includes data from one or more driving events where a handback event occurred or the driver manually assumed control of a vehicle. The driving events include information about the environment around the vehicle during the time leading up to the handback event and/or during the handback event. At block 506, the driving data may be analyzed, compared with other driving data, and/or processed by other means (e.g., by a neural network) to define one or more known conditions that are present in an environment during a predefined period of time leading up to a handback event and/or during the handback event. For example, the driving data may be analyzed to identify common conditions in an environment that occur or present themselves prior to a handback event. The one or more known conditions may form a set of conditions and/or a sequence of events that present themselves prior to a handback event occurring.

For example, a sequence of events including a plurality of known conditions may include: determining that the vehicle is in a construction zone, determining that there will be a change in traffic pattern due to the construction zone, and determining the presence of cones, a flagman, or other indicator that the traffic pattern in being altered to traverse the constructions zone. In some instances, when a vehicle is operating in an autonomous mode or is equipped with autonomous driving mechanisms, the autonomous system may be configured to handback control of a vehicle within a construction zone because traversing a construction zone may include various obstacles or activities that would be better suited for traversal by a human driver or at least overseen by a human driver should intervention be needed. Traversing a construction zone is only one example of an environment where a handback event may occur. Other non-limiting examples of environments where a handback event may occur include traversing school zones, shopping mall streets, parking lots, unmarked roads, accident scenes, traffic intense roads, or roads during certain weather events (e.g., snow storms, rain, fog, and/or high winds). Other driving environments may require a human driver to assist or take full control of maneuvering the vehicle through the environment. Such environments may depend on the sophistication of the autonomous driving system and/or the types and operational status of the various sensors equipped on the vehicle.

Referring back to block 504, the one or more known conditions determined from driving data may be utilized to compare, analyze, or otherwise process real-time, near real-time, or stored information obtained by the one or more environment sensors during driving to identify at least one condition that corresponds to a known condition present in the environment. At block 508, the system predicts an occurrence of a handback event based on the at least one condition identified from the information about the environment of the vehicle. As discussed in more detail below, the prediction may include a confidence value corresponding to a likelihood that the predicted occurrence of the handback event will occur and/or determining and highlighting salient portions of an environment to a driver.

Figure 6B:
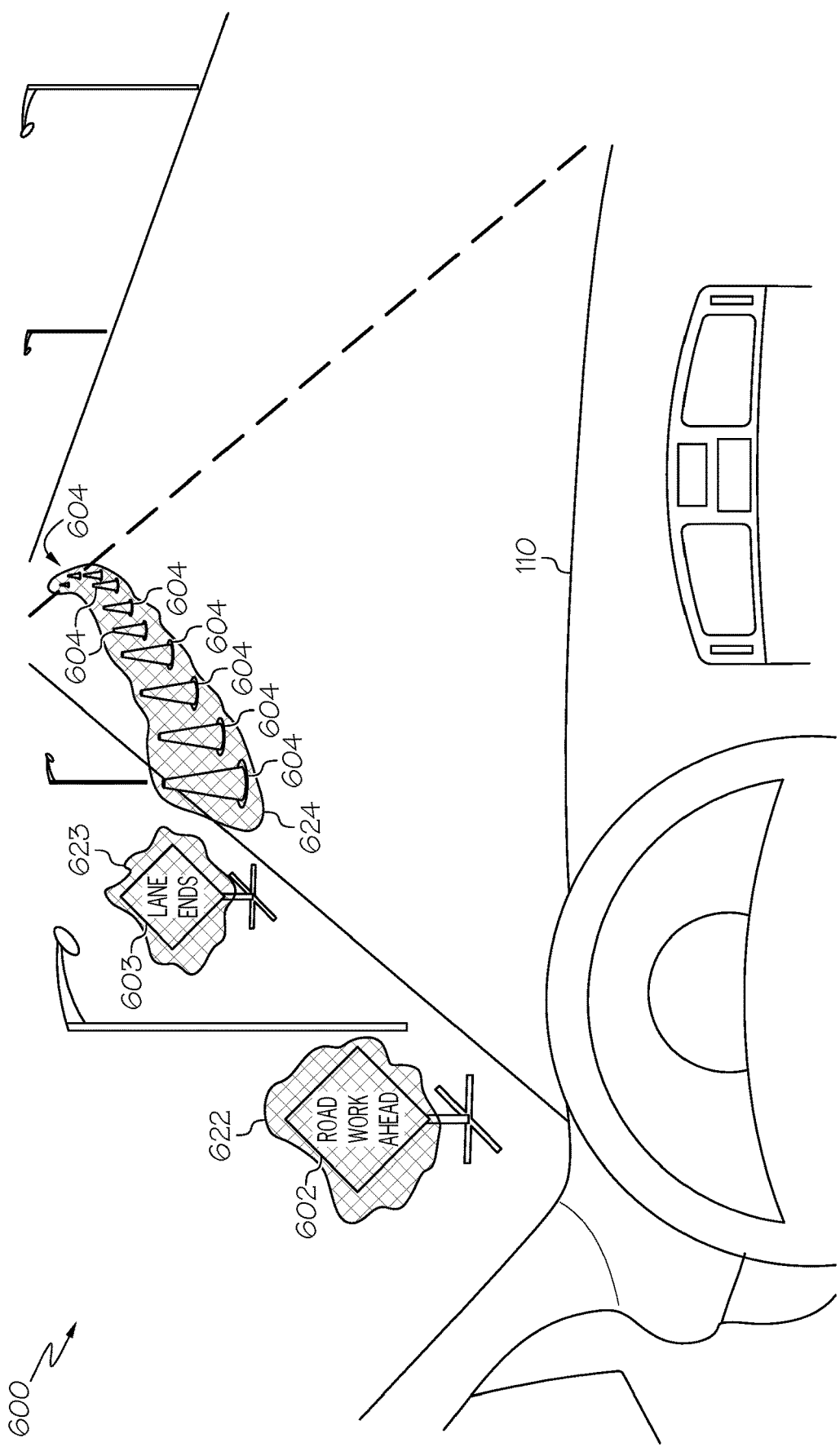
FIG. 6B depicts an illustrative environment around a vehicle including salient portions of the environment identifying the one or more known conditions indicative of a transfer of control of the vehicle to the driver, according to one or more embodiments shown and described herein.
Figure 6C:
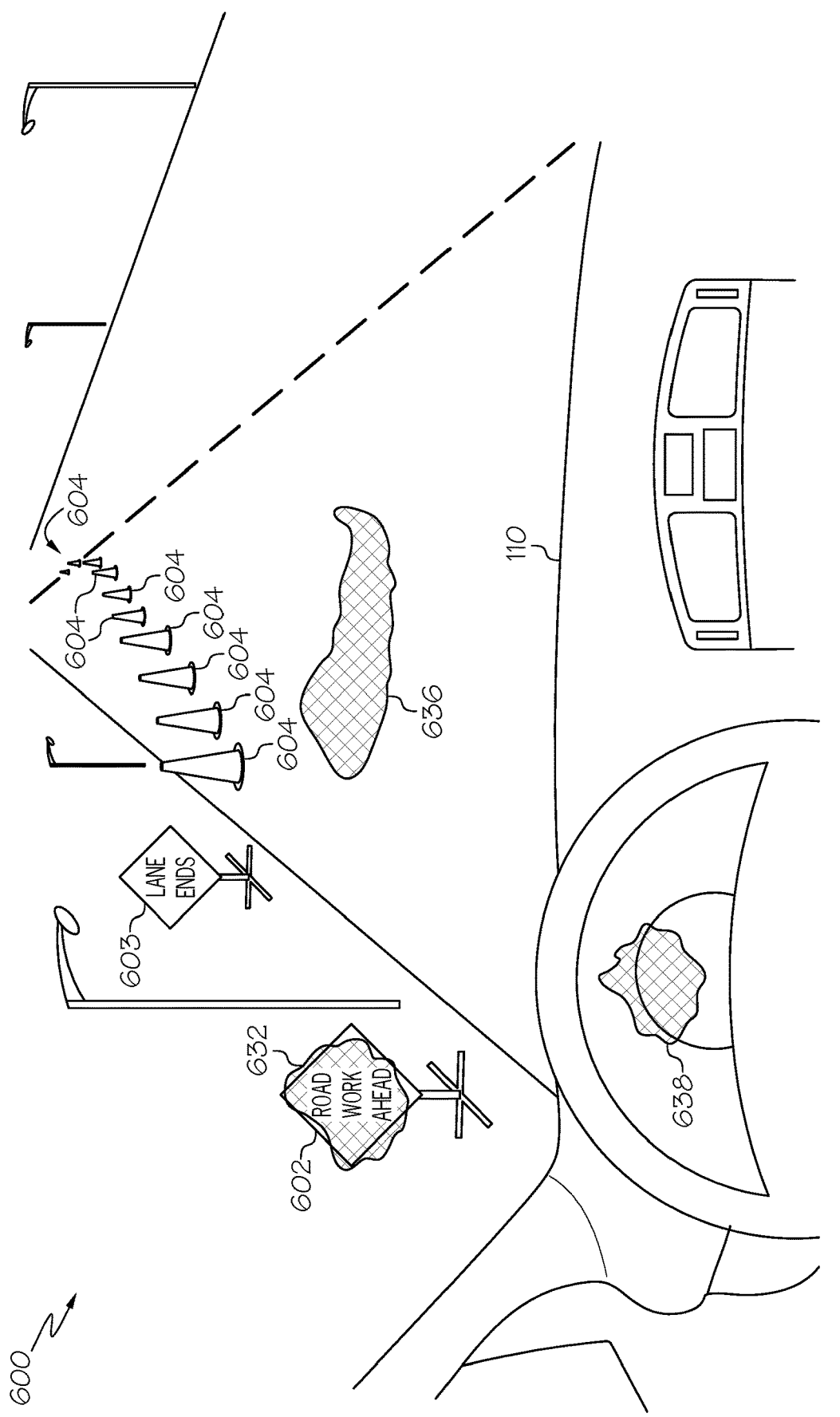
FIG. 6C depicts an illustrative environment around a vehicle including gaze pattern of a driver, according to one or more embodiments shown and described herein.

In some embodiments, at block 510 (See FIG. 5B, which illustrates the continuation of the flow diagram 500 of FIG. 5A), the system determines whether the information includes image data. In the event image data is included in the information about the environment of the vehicle, the system, at block 512, determines one or more salient portions of the environment that corresponds to the identified conditions. FIGS. 6A-6C, described in further detail below provide, an illustrative example of determining the one or more salient portions of the environment. The system may utilize one or more known yet to be developed saliency based image segmentation algorithms, object detection algorithms, and/or other image analysis approaches to determine the one or more salient portions of the environment.

The system may further receive gaze direction vectors from a gaze tracking system configured to monitor the gaze of a driver at block 514. At block 516, the gaze direction vectors may be processed to determine a gaze pattern of the driver. The gaze pattern may be visually represented as a heat map or gaze plot overlaid with the image data of the environment of the vehicle thereby identifying where the driver's gaze is concentrated. At block 518, the system compares the gaze pattern data to the one or more salient portions of the environment previously determined. The comparison carried out at block 518 results in a determination of whether the driver is or has gazed upon salient portions of the environment. In other words, the system may determine whether the driver is aware of the conditions in the environment, which have been identified as leading to a handback event and likewise a predicted occurrence of the handback event. Moreover, the system, at block 520, can determine a state of awareness of the driver from the comparison carried out in block 518. The state of awareness indicates whether the driver is paying attention to the environment of the vehicle and whether the driver is aware or at least gazed upon a feature in the environment corresponding to an identified and known condition that can lead to a handback event.

In response to determining the salient portions in the environment, the gaze pattern of a driver, and the state of awareness of the driver, the system determines an appropriate type and degree of an alert may be determined at block 522. For example, an alert may be a visual, auditory, haptic, combination thereof or another type. The degree may range from subtle to intense. A subtle alert may include presenting information on a display or verbally communicating with the driver that a condition leading to a handback event is detected. The degree of the alert may increase as the prediction that a handback event will occur becomes more likely. The degree of the alert may define the intensity, the amount of detail provided, or the interval of an auditory alert. Similarly, the degree of a visual type of alert may define the intensity and/or interval of visual indictors or displayed information configured to attain the attention of the driver and/or the amount of detail provided via the visual alert. A haptic type of alert may include a varying degree of force feedback and/or vibrations.

At block 524, once an alert is determined, the system provides the alert to the driver. In some embodiments, the alert may be a visual presented on a heads-up display highlighting salient portions of the environment to the driver in order to attain the driver's attention and make her aware of the one or more conditions identified and related to a predicted handback event. In some embodiments, a combination of alerts may be determined and generated. The alerts are configured to notify the driver with a type and degree of alert that corresponds to the imminence and/or likelihood that the predicted handback event occurs. That is, by grading the alert in such a way that corresponds to the driver's awareness, the driver may not become desensitized or ignore overly intense alerts when the predicted handback event is perceived as not likely by the driver or the driver is already prepared to receive operational control of the vehicle. Moreover, by combining the state of awareness of the driver with the determination of the degree and/or type of alert, a lesser intense alert may be needed if the driver is already aware of a condition in an environment.

Referring back to block 510, if no image data is included in the information, then the process continues to block 530, as shown in FIG. 5C. At block 530, the system determines a confidence value corresponding to the likelihood that the predicted occurrence of the handback event will occur. The confidence value may be determined based on the number of conditions identified in the information about the environment around the vehicle, a weighting associated with the conditions, the occurrence of a sequence of conditions identified in the information and/or based on other methods of assigning a confidence value to a prediction. In some embodiments, as more conditions that correspond to known conditions that lead to a handback event are identified in environments around the vehicle based on the received information, a confidence interval may be increased. For example, assume a handback event is known to occur when known conditions: condition A, condition B, and condition C are present either in combination or in a predefined sequence within an environment. When condition A is identified from the information about the environment, then the confidence value may be determined to be at a first value (e.g., indicating that the likelihood the handback event will occur is 33%). When condition B is also identified then the confidence value may increase to a second value (e.g., 66%). When condition C is further identified then the confidence value may increase to a third value (e.g., 90%).

In some embodiments, the order in which the known conditions occur and/or are identified in the information about the environment around the vehicle may affect the determined confidence value. For example, if a handback event is known to occur more often when known conditions A, B and C occur in order then when, for example, condition A is identified and then condition C is identified in the information, the confidence value may not be as high as a confidence value where conditions A, B and then C were identified. In such a case, the handback event may still occur when only conditions A and then C are identified because condition B may not have been detected, or may not be necessary for the specific handback event to occur. In some embodiments, each of the conditions leading up to a handback event may culminate in a single trigger event that causes the system to handback control of the vehicle or take alternative action if the driver is not ready to assume control. The trigger event may also be considered a condition and may result in a prediction having a confidence interval of, for example 100%.

The previous examples described herein refer generally to conditions without specific reference to what may constitute conditions leading to a handback event. In some embodiments, the conditions may include identifying a road sign, detecting an object, detecting a pattern of motion of traffic that may be abnormal to the expected flow, detecting the presence of flashing lights (e.g., construction yellow lights, red or blue emergency lights, or the like), detecting from the environment sensors a weather event such as rain or snow, or any other set of features or events that an autonomous system may be preprogrammed to transfer control back to a driver should they be present or occur. The examples herein are non-limiting and that the systems and methods described herein may be configured to identify any number and variety of conditions leading to a handback event and subsequently predict the occurrence of a handback event.

Still referring to FIGS. 5A-5C, once the confidence value is determined at block 530, the system determines a type and/or degree of alert to provide to a driver based on the confidence value at block 532. As describe above with reference to block 522, the alert may be a visual, auditory, haptic, combination thereof or another type. The degree may range from subtle to intense. A subtle alert may include presenting information on a display or verbally communicating with the driver that a condition leading to a handback event is detected. The degree of the alert may increase as the confidence value associated with the prediction that a handback event will occur increases. The degree of the alert may define the intensity, the amount of detail provided, or the interval of an auditory alert. Similarly, the degree of a visual type of alert may define the intensity and/or interval of visual indictors or displayed information configured to attain the attention of the driver and/or the amount of detail provided via the visual alert. A haptic type of alert may include a varying degree of force feedback and/or vibrations.

At block 534, once an alert is determined, the system provides the alert to the driver. In some embodiments, the alert may be an auditory or visual alert that increases in intensity as the confidence value increases. The alert may be provided through a speaker, a visual display, an illumination device, or the like. The alert may also be provided as a haptic alert. For example, the driver seat or steering wheel may be configured to vibrate to alert the driver of a predicted handback event. In some embodiments, a combination of alerts may be determined and generated. The alerts are configured to notify the driver with a type and degree of alert that corresponds to the imminence and/or likelihood that the predicted handback event occurs. That is, by grading the alert in such a way that it corresponds to the confidence value of the prediction, the driver may not become desensitized or ignore overly intense alerts when the predicted handback event is perceived as not likely by the driver.

Turning now to FIGS. 6A-6C, an illustrative environment 600 around a vehicle 110 is depicted where several conditions that lead to a handback event are present. In particular, FIG. 6A depicts an illustrative environment 600 around a vehicle 110 including one or more conditions indicative of a transfer of control of the vehicle to the driver, according to one or more embodiments shown and described herein. For example, and without limitation, an environment 600 may include a vehicle 110 traversing a construction zone along a roadway 601. The construction zone may include a construction sign 602 that alerts a driver to the presence of a beginning of a construction zone. For example, the construction sign 602 may include a message such as "ROAD WORK AHEAD." The construction environment 600 may also include a traffic sign 603, which alerts a driver to a change in traffic patterns as a result of the construction. For example, a traffic sign 603 may include a message such as "LANE ENDS" that alerts the driver to the closure and/or merger of one or more lanes. The construction environment 600 may also include a plurality of cones or construction barrels 604 that act as physical barriers to a vehicle forcing a vehicle to change their path or otherwise colliding with the construction barrels 604. Each of these signs and objects may serve as a known condition that indicates and/or leads to a handback event.

FIG. 6B depicts the same illustrative environment 600 from FIG. 6A but now includes salient portions identified by the systems and methods described herein that correspond to the one or more known conditions indicative of a transfer of control of the vehicle to the driver. For example, the system and method may employ one or more saliency techniques and/or algorithms that identify the salient portions in the image data that correspond to the conditions that may lead to a handback event. For example, a first salient portion 622 may be determined by the system, as depicted in FIG. 6B, encompassing the construction sign 602. Additionally, a second salient portion 623 may be determined by the system, as depicted in FIG. 6B, that encompasses the traffic sign 603. Furthermore, a third salient portion 624 may be determined by the system, as depicted in FIG. 6B, that encompasses one or more of the cones or construction barrels 604. Referring back to the method described in FIGS. 5A-5C, the salient portions of the image data of the environment 600 may be compared with gaze pattern data which may be presentable as a heat map or gaze plot, as illustratively depicted in FIG. 6C, to determine whether the driver is aware of a condition in the environment 600 that leads to a handback event.

Turning to FIG. 6C, an illustrative environment 600 around a vehicle including gaze pattern of a driver is depicted. Based on a gaze tracking system, a gaze pattern and subsequent heat map and/or gaze plot may be rendered which corresponds to the gazing activity of a driver. For example, as depicted in FIG. 6C, a driver appears to gaze in generally three areas of the vehicle environment 600 over a predefined period of time (e.g., over a few second, 10 seconds, 20 seconds, 30 seconds, etc.). The driver's gaze, for example, includes viewing the construction sign 602 as indicated by the first illustrated gaze pattern 632, the roadway 601 generally in front of the vehicle as indicated by the second illustrated gaze pattern 636, and the dashboard as indicated by the third illustrated gaze pattern 638.

By way of a non-limiting example, when the gaze pattern illustration of FIG. 6C is compared with the salient portions of FIG. 6B it may be determined that the driver is aware of the construction sign 602, but not the traffic sign 603 or the construction barrels 604. As a result, when a handback event is predicted based on at least the identification of the construction sign 602, the alert may subtle or optionally not provided since the driver is aware of the first condition. However, as the vehicle 110 continues to traverse the construction environment 600 and the traffic sign 603 and/or the construction barrels 604 are identified the provided alert may have an increased intensity or a more acute type of alert may be employed to bring the conditions to the driver's attention. That is, the driver may be made aware of the environment 600 so they may receive operational control of the vehicle when the handback is necessary.

It should be understood that the embodiments described herein are directed to systems and methods for predicting occurrences of a handback event. In embodiments, the systems and methods may utilize an electronic control unit and/or neural network to receive information about an environment of the vehicle, identify at least one condition represented in the information about the environment of the vehicle that corresponds to at least one of one or more known conditions that lead to a handback of operational control of the vehicle to the driver, and predict an occurrence of a handback event based on the at least one condition identified from the information about the environment of the vehicle. In embodiments that include a neural network, the neural networks may be trained in a variety of ways with a variety of data inputs. The selection of such data inputs for training may correspond to the ultimate or desired implementation of the neural network. That is, the neural network may be trained using data that will be available to the network when the trained neural network is implemented within a system or vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method for predicting a transfer of control of a vehicle to a driver, the method comprising:
   receiving information about an environment of the vehicle;
   identifying at least one condition represented in the information about the environment of the vehicle that corresponds to at least one of one or more known conditions that lead to a handback of operational control of the vehicle to the driver;
   determining a gaze pattern of the driver, wherein the gaze pattern defines a heat map or a gaze plot identifying one or more locations in the environment where the driver has gazed upon;
   comparing the gaze pattern of the driver to one or more salient portions of the environment;
   determining a state of awareness of the driver based on the comparison of the gaze pattern to the one or more salient portions of the environment, wherein the state of awareness defines a degree of awareness of the driver to the at least one condition identified from the information about the environment of the vehicle; and
   predicting the transfer of control of the vehicle to the driver based on the at least one condition identified from the information about the environment of the vehicle.

2. The method of claim 1, wherein the information about the environment of the vehicle includes image data of the environment around the vehicle captured by a camera.

3. The method of claim 2, further comprising determining, from the image data, the one or more salient portions of the environment, wherein at least one of the one or more salient portions of the environment corresponds to the at least one condition identified from the information about the environment of the vehicle.

4. The method of claim 1, further comprising providing an alert to the driver, wherein a degree or type of the alert provided to the driver corresponds to the state of awareness of the driver.

5. The method of claim 4, wherein the alert includes at least one of the following:
   a projection on a heads-up display identifying at least one of the one or more salient portions of the environment;
   an audio notification;
   a visual indicator; or
   a haptic feedback.

6. The method of claim 1, further comprising determining a confidence value corresponding to a likelihood that the predicted transfer of control of the vehicle to the driver occurs.

7. The method of claim 6, further comprising providing an alert to the driver, wherein a degree or a type of the alert provided corresponds to the confidence value.

8. The method of claim 1, further comprising:
   receiving driving data from one or more driving events, wherein the driving data includes the information about the environment of the vehicle leading up to and during past handback events; and
   determining the one or more known conditions that lead to the handback of operational control of the vehicle to the driver.

9. The method of claim 8, wherein the driving data further includes the information about the environment of the vehicle when the driver manually assumes control of the vehicle.

10. A system for predicting a transfer of control of a vehicle to a driver comprising:
    an electronic control unit;
    a gaze tracking system communicatively coupled to the electronic control unit; and
    one or more environment sensors communicatively coupled to the electronic control unit, wherein the one or more environment sensors capture information about an environment of the vehicle, wherein the electronic control unit is configured to:
      receive the information about the environment of the vehicle from the one or more environment sensors;
      receive gaze direction vectors of the driver from the gaze tracking system;
      identify at least one condition represented in the information about the environment of the vehicle that corresponds to at least one of one or more known conditions that lead to a handback of operational control of the vehicle to the driver;
      determine a gaze pattern of the driver based on the received gaze direction vectors of the driver, wherein the gaze pattern defines a heat map or a gaze plot identifying one or more locations in the environment where the driver has gazed upon;

compare the gaze pattern of the driver to one or more salient portions of the environment;

determine a state of awareness of the driver based on the comparison of the gaze pattern to the one or more salient portions of the environment, wherein the state of awareness defines a degree of awareness of the driver to the at least one condition identified from the information about the environment of the vehicle; and predict the transfer of control of the vehicle to the driver based on the at least one condition identified from the information about the environment of the vehicle.

11. The system of claim 10, wherein the one or more environment sensors includes a camera, wherein the information about the environment includes image data of the environment captured by the camera, and wherein the electronic control unit is further configured to:

determine, from the image data, the one or more salient portions of the environment, wherein at least one of the one or more salient portions of the environment corresponds to the at least one condition identified from the information about the environment of the vehicle.

12. The system of claim 10, wherein the electronic control unit is further configured to:

provide an alert to the driver, wherein a degree or type of the alert provided to the driver corresponds to the state of awareness of the driver.

13. The system of claim 10, wherein the electronic control unit is further configured to:

determine a confidence value corresponding to a likelihood that the predicted transfer of control of the vehicle to the driver occurs.

14. The system of claim 13, wherein the electronic control unit is further configured to:

provide an alert to the driver, wherein a degree or a type of the alert provided corresponds to the confidence value.

15. The system of claim 10, wherein the electronic control unit is further configured to:

receive driving data from one or more driving events, wherein the driving data includes the information about the environment of the vehicle leading up to and during past handback events; and determine the one or more known conditions that lead to the handback of operational control of the vehicle to the driver.

16. The system of claim 15, wherein the driving data further includes the information about the environment of the vehicle when the driver manually assumes control of the vehicle.

17. A system for predicting a transfer of control of a vehicle to a driver comprising:

an electronic control unit configured to implement a neural network; and one or more environment sensors communicatively coupled to the electronic control unit, wherein the one or more environment sensors capture information about an environment of the vehicle, and wherein the electronic control unit is configured to:

receive, as an input to the neural network, the information about the environment of the vehicle from the one or more environment sensors;

receive gaze direction vectors of the driver;

identify, with the neural network, at least one condition represented in the information about the environment of the vehicle that corresponds to at least one of one or more known conditions that lead to a handback of operational control of the vehicle to the driver;

determine a gaze pattern of the driver based on the received gaze direction vectors of the driver, wherein the gaze pattern defines a heat map or a gaze plot identifying one or more locations in the environment where the driver has gazed upon;

determine, with the neural network configured to receive as an input at least the gaze pattern and the at least one condition, a state of awareness of the driver, wherein the state of awareness defines a degree of awareness of the driver to the at least one condition identified from the information about the environment of the vehicle; and predict, with the neural network, the transfer of control of the vehicle to the driver based on the at least one condition identified from the information about the environment of the vehicle.

18. The system of claim 17, wherein the neural network is trained by:

receiving driving data from one or more driving events, wherein the driving data includes the information about the environment of the vehicle leading up to and during past handback events;

analyzing the driving data for common conditions leading up to past handback events; and determining the one or more known conditions that lead to the handback of operational control of the vehicle to the driver.

* * * * *